United States Patent
Levitan

(10) Patent No.: US 7,412,620 B2
(45) Date of Patent: Aug. 12, 2008

(54) METHOD FOR TESTING ABILITY TO RECOVER FROM CACHE DIRECTORY ERRORS

(75) Inventor: David Stephen Levitan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 11/165,030

(22) Filed: Jun. 23, 2005

(65) Prior Publication Data

US 2007/0011599 A1     Jan. 11, 2007

(51) Int. Cl.
*G06F 11/00* (2006.01)
(52) U.S. Cl. ............................ 714/6; 714/41; 714/42; 714/703; 714/800
(58) Field of Classification Search ............ 714/41, 714/42, 703, 800, 6
See application file for complete search history.

(56) References Cited

U.S. PATENT DOCUMENTS 5,872,910 A * 2/1999 Kuslak et al. ............... 714/41
6,539,503 B1 * 3/2003 Walker ....................... 714/703
6,751,756 B1 * 6/2004 Hartnett et al. ............... 714/54
2007/0271485 A1 * 11/2007 Weiberle et al. .............. 714/42

* cited by examiner

*Primary Examiner*—Robert W Beausoliel, Jr.
*Assistant Examiner*—Charles Ehne
(74) *Attorney, Agent, or Firm*—Duke W. Yee; Diana R. Gerhardt; Houda El-Jarrah

(57) ABSTRACT

A method, apparatus, and computer program product are disclosed for testing a data processing system's ability to recover from cache directory errors. A directory entry is stored into a cache directory. The directory entry includes an address tag and directory parity that is associated with that address tag. A cache entry is stored into a cache that is accessed using the cache directory. The cache entry includes information and cache parity that is associated with that information. The directory parity is altered to imply bad parity. The bad parity implies that the address tag that is associated with this parity is invalid. The information included in the cache entry is altered to be incorrect information. However, although the information is now incorrect, the cache parity continues to imply good parity which implies that the data is good. This good parity implies that the information that is associated with the parity is valid, even though it is not. The data processing system's ability to recover from errors is tested using the directory entry and the cache entry.

8 Claims, 6 Drawing Sheets

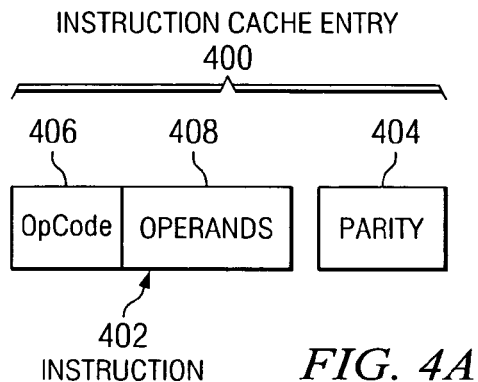
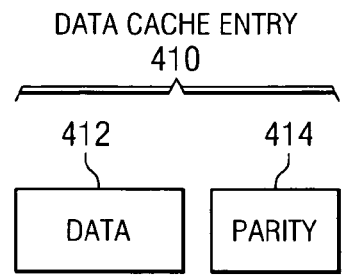
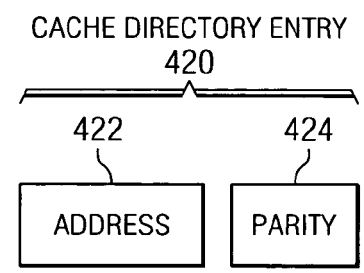
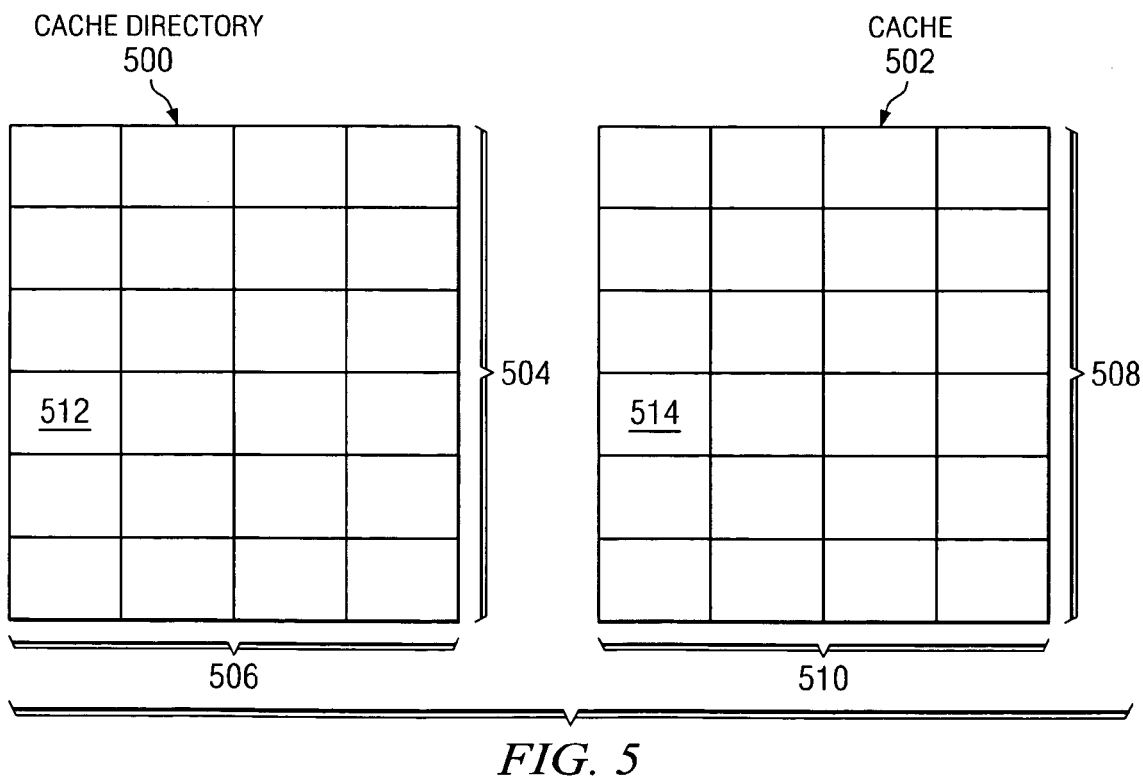

METHOD FOR TESTING ABILITY TO RECOVER FROM CACHE DIRECTORY ERRORS

BACKGROUND OF THE INVENTION

1. Field of the Invention

The present invention is directed to data processing systems. More specifically, the present invention is directed to a method, apparatus, and computer program product for testing a data processing system's ability to recover from cache directory errors.

2. Description of the Related Art

Cache memories are relatively small buffer memories used in computer systems to provide temporary storage for data retrieved from larger, slower main memory devices, such as main memory in the computer system or external storage devices such as hard disk drives. Cache memories are located near the processor cores that they serve, and are used to store copies of data that has recently been used by a processor core and/or is likely to be used by the processor core in the near future. Use of cache memory can frequently reduce the period of time for data access that would otherwise be required for accessing to main memory. Cache memories, if properly managed, can significantly improve computer system performance.

A central processing unit in a computer system needs less time to obtain data from a cache memory than it does to obtain the same data by accessing the main memory or an external storage device. If a reasonable percentage of the data needed by a central processing unit is maintained in cache memory, the amount of processor time wasted waiting for data to be retrieved from main memory is significantly reduced, improving the computer system performance.

When a processor core needs particular information, the processor core first looks to its cache memory to determine whether information is currently stored in its cache memory. The information retrieved from the cache may be data, instruction, or a combination of data and instruction. Thus, the cache may be a data cache, an instruction cache, or a cache that includes a combination of instruction and data.

If the requested information is found in the cache, this is called a "hit". If the requested information cannot be found in the cache, this is called a "miss". A miss necessitates a "fetch" operation to retrieve the memory from other storage, such as main memory in the computer system or an external storage device.

A processor chip may include multiple processor cores within that chip. Each processor core may include at least one cache memory that is associated with the processor core. A cache is often included in the processor core itself for use by that processor core. In addition, other caches may be included within a chip for use by the processor cores included in that chip.

There are several different kinds of caches including direct mapped caches, set associative caches, and content addressable memory or CAM type caches.

The simplest type of cache is a direct mapped cache. With a direct mapped cache a subset of the bits are used to address both the directory portion of the cache and the data portion of the cache. Generally the low order bits of the address are used to address the cache and directory arrays. The bits that are not used to address the cache are stored in the directory. In addition there is a valid bit associated with each entry in the cache. A cache hit in the direct mapped cache occurs when the bits of the address that are stored in the directory matches the address bits that are being fetched, and the entry is marked as being valid by its associated valid bit. As an example, there may be a four-entry cache and four address bits. Bits 2:3 of the address would be used to address the directory while bits 0:1 of the address would be stored in the directory with a valid bit.

A set associative cache is several direct mapped caches side by side. In a direct mapped cache each address can only exist in one place in the cache. In a set associative cache the data can exist in multiple places or "ways". When the data is loaded into the cache the hardware must determine in which "way" it will store the data in the cache. Typically this is done with a least recently used scheme (LRU), but sometimes other schemes are used. Based on which "way" the cache directory matched determines which "way" the data should be muxed out. If none of the "way" addresses match then there is a miss.

A CAM is a set associative instruction cache (Icache) where none of the bits are used to address the array and all of the bits are used for the compare, e.g., if there is a four-entry CAM, all four entries in the CAM would contain address compares for all the bits.

Some caches use parity. For these caches, each entry in the cache and the cache directory includes an associated parity. This parity is typically one bit although multiple bits may be used. Parity is used for error-checking. Parity implies whether the associated entry includes an even or odd number of logical ones. If, for a particular entry, the associated parity bit implies that the parity for the entry is odd and the system is using even parity, a determination is made that an error has occurred. Thus, the parity for this entry is said to be "bad". Conversely, if, for that particular entry, the parity bit implies that the parity for the entry is even, a determination is made that no error has occurred. Thus, the parity for this entry is said to be "good".

When the parity that is associated with a cache directory entry is bad, an error has occurred and the cache directory entry is not valid. In this case, any information that is retrieved from the cache that corresponded to that cache directory entry should not be forwarded or processed. If an error occurs, the system can either implement an error recovery process or execute a machine stop or machine check.

If an error recovery process is not executed properly, the invalid information could be processed by the machine which results in inaccurate results by the system or a system malfunction such as a system crash. Thus, it is important that the error recovery process be executed properly.

An error recovery process must also be able to recover when the information in the cache is incorrect. This incorrect information should not be processed by the system.

The error recovery process may be tested by injecting an error into the cache directory and then making sure that the error recovery mechanism in the system recovered properly from that injected defect. However, it can be difficult to determine whether the error recovery mechanism recovered properly from that injected defect.

For example, an error may be injected into the cache directory by changing a bit in the entry. This would result in a cache directory hit when the address that is now being fetched just happens to match a directory entry only because the entry was corrupted. In this case, there was a hit in the cache directory only because the defect caused the address to change from address A to address B and the cache happened to have the data for address A.

However, the parity bit associated with this directory entry would now imply bad parity. If address A were needed, a cache miss would occur and no extra recovery action would be required. If an attempt were made to fetch address B, there would be a hit in the cache but the directory entry's parity would imply bad parity. In this case, the error detection logic would be required to properly detect and recover from the error.

Therefore, a need exists for a method, apparatus, and computer program product for testing a data processing system's ability to recover from cache directory errors.

SUMMARY OF THE INVENTION

A method, apparatus, and computer program product are disclosed for testing a data processing system's ability to recover from cache directory errors. A directory entry is stored into a cache directory. The directory entry includes an address tag and directory parity that is associated with that address tag. A cache entry is stored into a cache that is accessed using the cache directory. The cache entry includes information and cache parity that is associated with that information. The directory parity is altered to imply bad parity. The bad parity implies that the address tag that is associated with this parity is invalid. The information included in the cache entry is altered to be incorrect information. However, although the information is now incorrect, the cache parity continues to imply good parity which implies that the data is good. This good parity implies that the information that is associated with the parity is valid, even though it is not. The data processing system's ability to recover from errors is tested using the directory entry and the cache entry.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4A is a block diagram of an instruction cache entry, which may be processed by the processor of FIG. 3, in accordance with the present invention;

FIG. 4B is a block diagram of an entry in a data cache, which may be processed by the processor of FIG. 3, in accordance with the present invention;

FIG. 4C is a block diagram of an entry in a cache directory, which may be processed by the processor of FIG. 3, in accordance with the present invention;

FIG. 5 illustrates a cache directory and its associated cache in accordance with the present invention;

DETAILED DESCRIPTION OF THE PREFERRED EMBODIMENT

Figure 1:
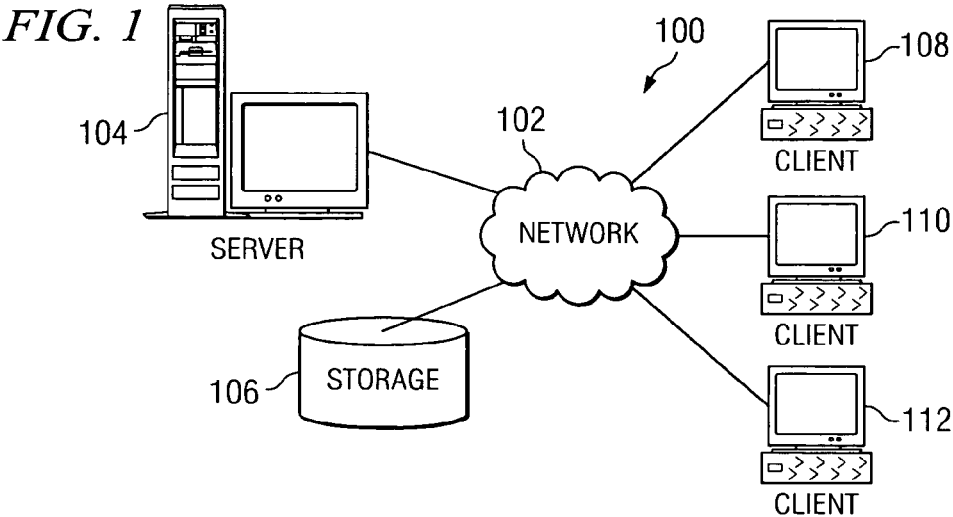
FIG. 1 is a pictorial representation of a network of computer system machines that includes the present invention in accordance with the present invention.

A preferred embodiment of the present invention and its advantages are better understood by referring to the figures, like numerals being used for like and corresponding parts of the accompanying figures.

A method, apparatus, and computer program product are disclosed for testing a data processing system's ability to recover from cache directory errors. A directory entry is stored into a cache directory. The directory entry includes an address tag and directory parity that is associated with that address tag. A cache entry is stored into a cache that is accessed using the cache directory. The cache entry includes information and cache parity that is associated with that information.

According to the present invention, a defect, or error, is injected into the cache directory by injecting an error into a particular directory entry. An error is injected into this directory entry by altering the parity that is associated with the directory entry so that the parity implies bad parity. This bad parity, then, implies that the associated directory address tag in the directory entry is invalid.

In addition, an error is also injected into the cache entry that is associated with the particular directory entry. The information included in the corresponding cache entry is altered so that the information is incorrect. The information is altered in such a way, though, that the cache parity for this corresponding cache entry continues to imply good parity. Thus, the cache parity implies that the information is valid even though the information is actually incorrect.

The data processing system's ability to recover from cache directory errors is tested using the particular directory entry and its corresponding cache entry. The directory entry, having the bad parity, is processed to locate the corresponding entry in the cache. Once the corresponding entry in the cache is located, its information is retrieved from the cache. In parallel with retrieving the information from the cache, the directory entry is analyzed to determine whether the directory parity, that is associated with the particular directory entry, implies good or bad parity. If the directory parity implies bad parity, a recovery process is initiated because the directory entry is determined to be invalid due to the bad parity.

In order to determine whether the recovery process was properly executed, an error has been injected into the cache entry that corresponds to the particular directory entry. The error is injected into the cache entry by altering the information in the cache entry while maintaining good parity. The information is altered in a way such as, preferably, to clearly indicate a failure if the error recovery process is not executed properly.

If the error recovery process is executed properly once the cache directory error is detected, the information in the cache will not be processed by the system. If the error recovery process is not executed properly once the cache directory error is detected, the information in the cache will be processed by the system. This information, however, includes an error itself. Thus, the processing of this incorrect information will result in the system not behaving in an expected manner. The failure of the error recovery process will be able to be detected because the system will not be behaving in an expected manner.

FIG. 1 is a pictorial representation of a network of computer systems that includes the present invention in accordance with the present invention. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers, network computers, or other computing devices. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

Of course, network data processing system 100 also may be implemented as a number of different types of networks, such as for example, an intranet, a local area network (LAN), a wide area network (WAN), or a wireless network. FIG. 1 is intended as an example, and not as an architectural limitation for the present invention.

Figure 2:
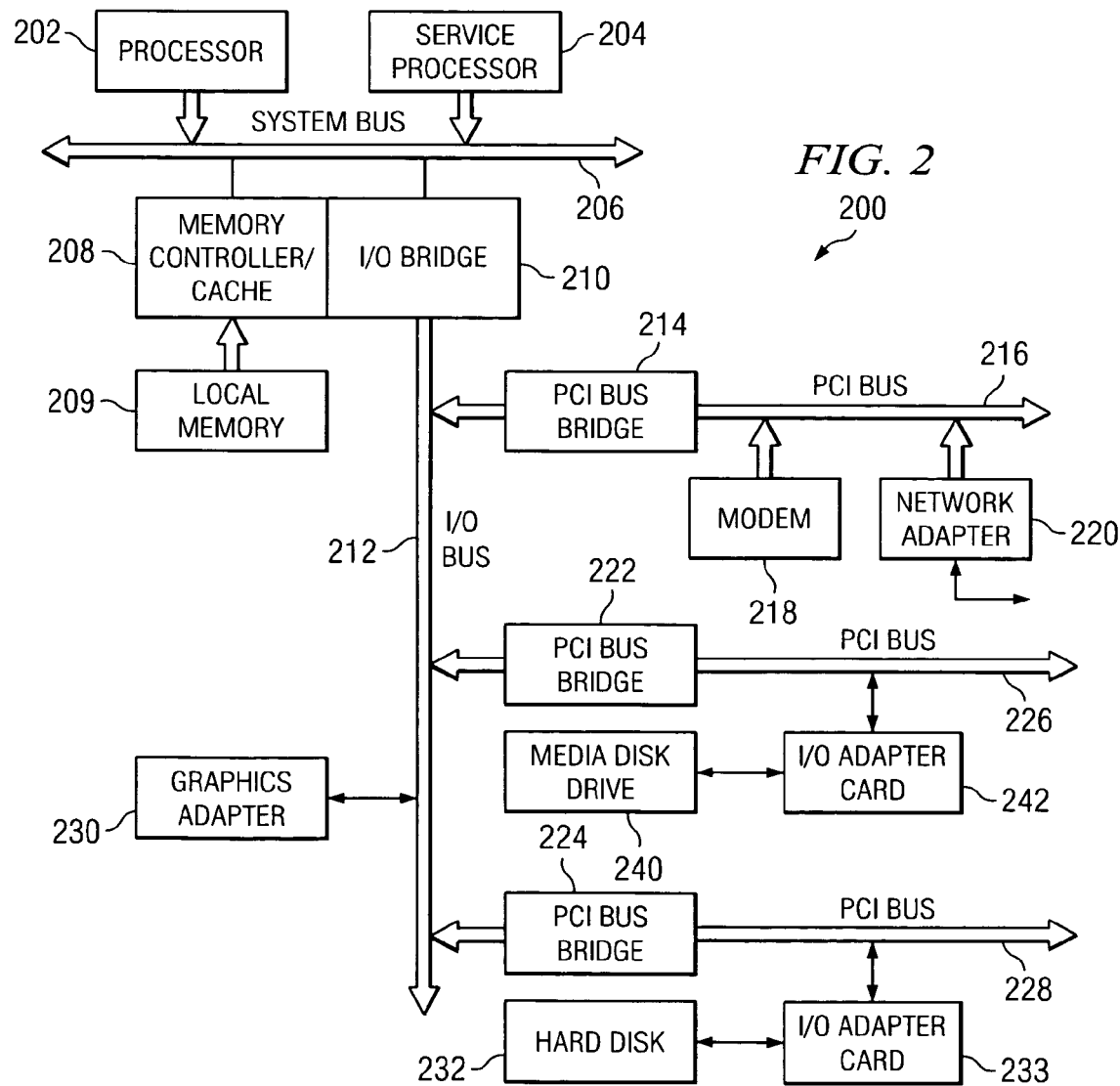
FIG. 2 is a block diagram of a computer system, such as one of the computer system machines depicted in FIG. 1, that includes the present invention in accordance with the present invention.

FIG. 2 is a block diagram of a computer system that includes the present invention in accordance with the present invention. Computer system 200 may be a symmetric multiprocessor (SMP) system including a plurality of processors 202 and 204 connected to system bus 206. Alternatively, a single processor system may be employed. In the depicted example, processor 204 is a service processor. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to other computers may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 may also be connected to I/O bus 212 as depicted, either directly or indirectly.

A storage device, such as hard drive 232 is coupled to a PCI bus, such as bus 228, via an I/O adapter card 233. Hard drive 232 may be implemented using any type of technology. For example, hard drive 232 may be a SAS drive or may be a SCSI drive. Adapter card 233 then maps PCI bus as either a SCSI bus or SAS bus depending on the type of interface technology supported by the hard drive 232.

Another storage device, such as a digital media drive 240, is included in system 200. Digital media drive 240 is coupled to PCI bus 226 via an I/O adapter card 242. Digital media drive 240 may be utilized to read, i.e. play, data that is stored on digital storage media, such as a CD-ROM or a DVD-ROM, when that digital storage media is inserted into digital media drive 240. Other types of digital storage media may be utilized in digital media drive 240 to play the data that is stored in the digital storage media.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
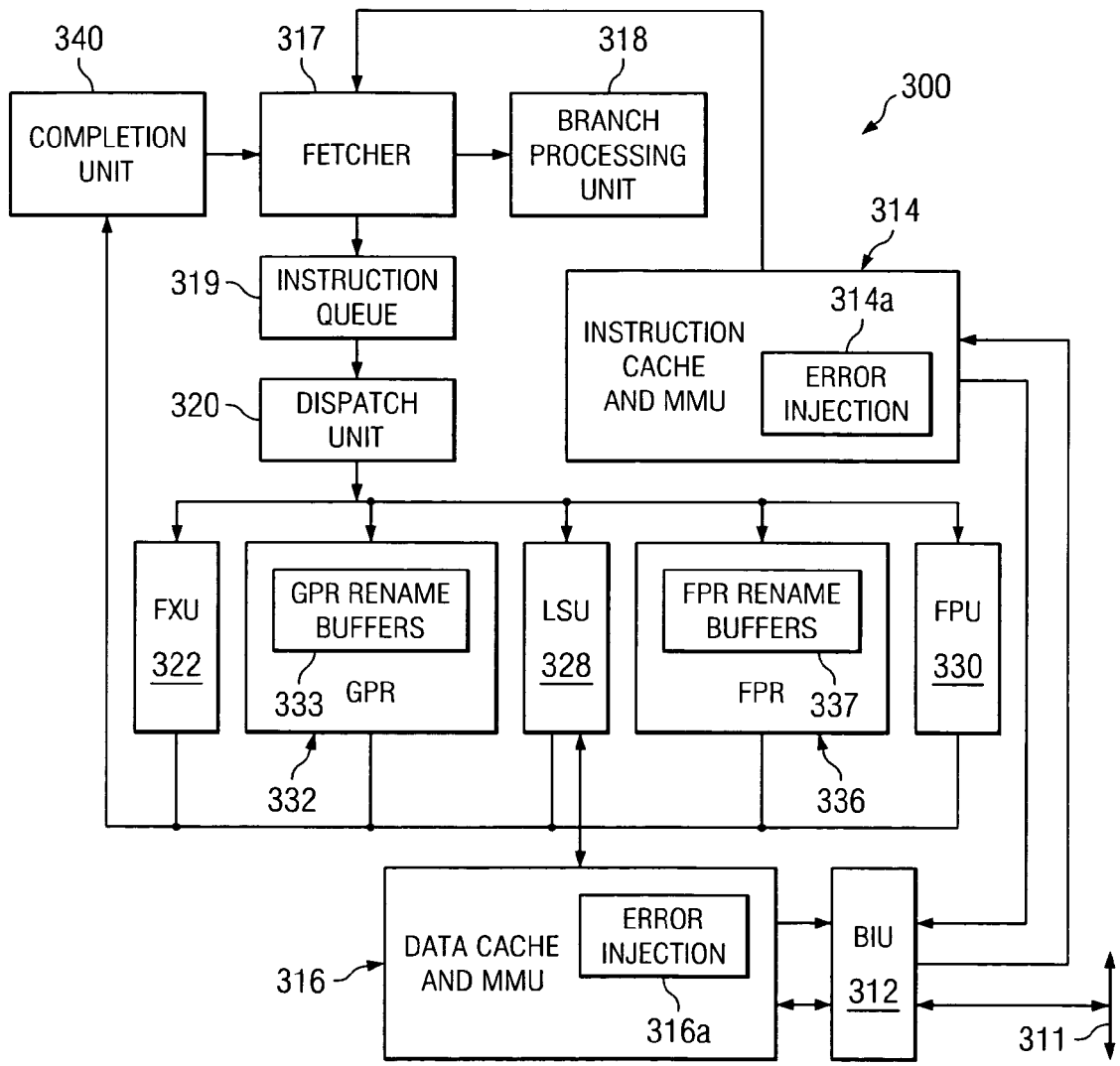
FIG. 3 is a block diagram of a processor core, such as depicted in FIG. 2, for processing information according to a preferred embodiment of the present invention.

FIG. 3 is a block diagram of processor 300 for processing information according to a preferred embodiment of the present invention. Processor 300 may be located within data processing system 200 as depicted in FIG. 2. In the depicted embodiment, processor 300 comprises a single integrated circuit superscalar microprocessor. Accordingly, as discussed further below, processor 300 includes various execution units, registers, buffers, memories, and other functional units, which are all formed by integrated circuitry. In a preferred embodiment of the present invention, processor 300 comprises one of the PowerPc™ line of microprocessors. As depicted in FIG. 3, processor 300 is coupled to system bus 311 via a bus interface unit (BIU) 312 within processor 300. BIU 312 controls the transfer of information between processor 300 and other devices coupled to system bus 311 such as a main memory (not illustrated).

BIU 312 is connected to instruction cache 314 and data cache 316 within processor 300. High speech caches, such as instruction cache 314 and data cache 316, enable processor 300 to achieve relatively fast access time to a subset of data or instructions previously transferred from main memory to instruction cache 314 and data cache 316, thus improving the speed of operation of the data processing system.

Instruction cache 314 includes error injection mechanism 314a. Error injection mechanism 314a is preferably a hardware mechanism although it could be implemented in both hardware and software or solely in software. Error injection mechanism 314a injects errors into instruction cache 314 as described herein by altering bits in a cache directory entry's associated parity and by altering bits in an instruction in the instruction cache 316.

Data cache 316 includes error injection mechanism 316a. Error injection mechanism 316a is preferably a hardware mechanism although it could be implemented in both hardware and software or solely in software. Error injection mechanism 316a injects errors into data cache 316 as described herein by altering bits in a cache directory entry's associated parity and by altering bits in data in the data cache 316.

Instruction cache 314 is further coupled to fetcher 317, which fetches instructions from instruction cache 314 during each cycle for execution. Fetcher 317 stores instructions within instruction queue 319 for execution by other execution circuitry within processor 300. Branch instructions are also transmitted to branch processing unit (BPU) 318 for execution. BPU 318 is a branch prediction and fetch redirection mechanism.

In the depicted embodiment, in addition to BPU 318, the execution circuitry of processor 300 comprises multiple execution units, including fixed-point unit (FXU) 322, load/store unit (LSU) 328, and floating-point unit (FPU) 330. As is well known by those skilled in the art, each of execution units FXU 322, LSU 328, and FPU 330 executes one or more instructions within a particular class of sequential instructions during each processor cycle. For example, FXU 322 performs fixed-point mathematical operations such as addition, subtraction, ANDing, ORing, and XORing utilizing source operands received from specified general purpose registers (GPRs) 332. Following the execution of a fixed point instruction, FXU 322 outputs the data results of the instruction to GPR rename buffers 333, which provide temporary storage for the result data until the instruction is completed by transferring the result data from GPR rename buffers 333 to one or more of GPRs 332.

Conversely, FPU 330 performs floating-point operations, such as floating-point multiplication and division, on source operands received from floating-point registers FPRs 336. FPU 330 outputs data resulting from the execution of floating-point instructions to selected FPR rename buffers 337, which temporarily store the result data until the instructions are completed by transferring the result data from FPR rename buffers 337 to selected FPRs 336.

As its name implies, LSU 328 executes floating-point and fixed-point instructions which either load data from memory (i.e., either data cache 316, a lower level cache, or main memory) into selected GPRs 332 or FPRs 336 or which store data from a selected GPRs 332 or FPRs 336 to memory.

Processor 300 employs both pipelining and out-of-order execution of instructions to further improve the performance of its superscalar architecture. Accordingly, instructions can by executed by FXU 322, LSU 328, and FPU 330 in any order as long as data dependencies are observed. In addition, instructions are processed by each of FXU 322, LSU 328 and FPU 330 at a sequence of pipeline stages.

As is typical of high performance processors, each instruction is processed at multiple distinct pipeline stages, such as fetch, decode/dispatch, execute, finish and completion.

During the fetch stage, fetcher 317 retrieves one or more instructions associated with one or more memory addresses from instruction cache 314. Instructions fetched from instruction cache 314 are stored by fetcher 317 within registers such as instruction queue 319. Additionally, fetcher 317 also forwards branch instructions from within the instruction stream to BPU 318 for execution.

FIG. 4A is a block diagram of an instruction cache entry, which may be processed by the processor of FIG. 3, in accordance with the present invention. The present invention tests the ability of a system to recover from an error in a cache directory. The cache directory may be a directory into an instruction cache.

Instructions are written into the instruction cache. Each instruction has an associated parity bit that is calculated for its associated instruction. The parity bit will imply whether parity for the associated instruction is good or bad. According to the present invention, the parity bit is stored along with the instruction as an entry in the instruction cache. Thus, in the instruction cache, each entry includes the instruction as well as that instruction's parity bit.

For example, instruction cache entry 400 includes an instruction 402 and parity 404. Instruction 402 includes opcode 406 and operands 408. Parity bit 404 is associated with instruction 402. Parity bit 404 implies whether instruction 402 is valid or not.

FIG. 4B is a block diagram of an entry in a data cache, which may be processed by the processor of FIG. 3, in accordance with the present invention. Instead of a cache directory being a directory into an instruction cache, the cache directory may be a directory into a data cache.

Each data entry has an associated parity bit that is calculated for its associated data. The parity bit will imply whether parity for the associated data is good or bad. According to the present invention, the parity bit is stored along with the data as an entry in the data cache. Thus, in the data cache, each entry includes data as well as that data's parity bit.

For example, data entry 410 includes data 412 and parity bit 414. Parity bit 414 is associated with data 412. Parity bit 414 implies whether data 412 is valid or not.

FIG. 4C is a block diagram of an entry in a cache directory, which may be processed by the processor of FIG. 3, in accordance with the present invention. Each cache directory entry includes an address tag and an associated parity bit that is calculated for its associated address tag. The parity bit will imply whether parity for the associated address tag is good or bad. According to the present invention, the parity bit is stored along with the address tag as an entry in the cache directory. Thus, in the cache directory, each entry includes an address tag as well as the address tag's parity bit.

For example, cache directory entry 420 includes address tag 422 and parity bit 424. Parity bit 424 is associated with cache directory entry 420 and implies whether parity for the address tag 422 is good or bad. Parity bit 424 implies whether address tag 422 is valid or not.

FIG. 5 illustrates a cache directory and a cache in accordance with the present invention. Cache directory 500 is a directory into cache 502. Cache 502 may be an instruction cache or a data cache.

Cache directory 500 includes a plurality of rows 504 and a plurality of columns 506. Cache 502 includes a plurality of rows 508 and a plurality of columns 510. Cache 502 includes the same number of rows and columns as are included in cache directory 500. Each entry in these caches is defined by its particular location in its respective row and column.

Each entry in cache directory 500 corresponds to an entry in cache 502 having the same relative row/column location. For example, entry 512 in cache directory 502 corresponds to entry 514 in cache 502 because the entries are both in the first column of the fourth row in their respective caches.

To retrieve an instruction, an address tag of the instruction is applied to cache directory 500 to determine whether that address tag is located in any of the entries of cache directory 500. If the address tag is located, a cache directory hit has occurred and the instruction is retrieved from cache 502. If the address tag is not located in the cache directory, a cache directory miss has occurred and the instruction cannot be retrieved from cache 502 and must be retrieved from other memory such as system memory.

If a cache directory hit has occurred, the location of the entry in cache directory 500 where the address tag was found is used to locate the corresponding entry in cache 502. For example, if the address tag was found in entry 512 in cache directory 502, entry 514 would be accessed in cache 502. The instruction that is stored in entry 514 would then be returned from cache 502.

While entry 514 is being accessed to retrieve the instruction that is stored in entry 514, the entry 512 is further analyzed to determine whether entry 512 included an associated parity bit that implied that the directory address tag was good or bad. If the parity implied that the directory address tag was good, the information returned from cache 502 may continue to be processed. If the parity implied that the directory address tag was bad, an error recovery process is initiated.

The parity bit in the located entry in cache 502 operates in a similar manner. Entry 514 is further analyzed to determine whether entry 514 included an associated parity bit that implied that the information, either instruction or data, returned from entry 514 was good or bad. If the parity implied that the information returned from entry 514 was good, the information returned from cache 502 is forwarded to other processing units for processing. If the parity implied that the information returned from entry 514 was bad, an error recovery process is initiated.

Figure 6:
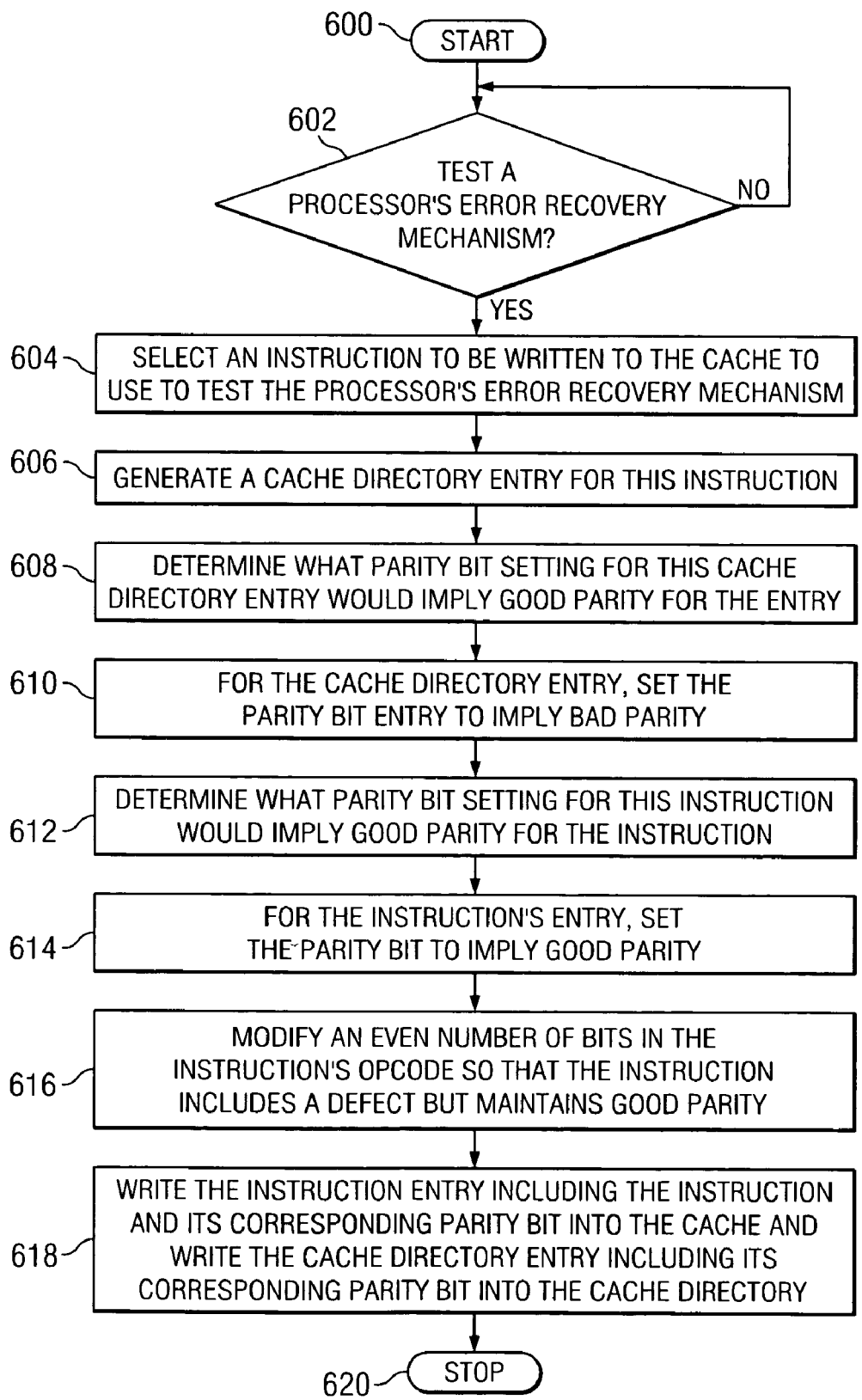
FIG. 6 depicts a high level flow chart that illustrates writing an entry into the cache directory and writing information, such as an instruction or data, into the cache that will be used to test the system's ability to perform error recovery in accordance with the present invention.

FIG. 6 depicts a high level flow chart that illustrates writing an entry into the cache directory and writing information, such as an instruction or data, into the cache that will be used to test the system's ability to perform error recovery in accordance with the present invention. The process starts as depicted by block 600 and thereafter passes to block 602 which illustrates a determination of whether or not to test a system's error recovery mechanism, including error recovery hardware and software, in the system. If a determination is made not to test the error recovery mechanism, the process passes back to block 602. If a determination is made to test the error recovery mechanism, the process passes to block 604 which illustrates selecting an instruction to be written to the cache to use to test the error recovery mechanism in the system.

Thereafter, block 606 depicts generating a cache directory entry for the selected instruction. The cache directory entry includes the address tag that corresponds to the instruction that was written into the cache. Block 608, then, illustrates determining what parity bit setting for this address tag in the cache directory entry would imply good parity for the entry. Next, block 610 depicts setting the parity bit for the cache directory entry to imply bad parity. The process then passes to block 612 which illustrates determining what parity bit setting for this instruction would imply good parity for the instruction. This can be accomplished, for example, by changing the value for the parity bit for the cache directory from one value to the other value. For example, if parity bit is currently a logical "1", the bit is altered so that it is now a logical "0".

Next, block 614 depicts setting the parity bit for the instruction to imply good parity. Block 616, then, illustrates modifying an even number of bits in the instruction's opcode so that the instruction includes a defect but maintains good parity. This can be accomplished, for example, by changing the value for two bits from one value to the other value in the parity for the cache. For example, the value of two bits in the instruction that are each currently a logical "1" are both altered so that they are now each logical "0s". Alternatively, the value of a first bit could be changed from a logical "0" to a logical "1" while the value of a second bit could be changed from a logical "1" to a logical "0".

Thereafter, block 618 depicts writing the instruction including its corresponding parity bit as an instruction cache entry into the instruction cache and writing the cache directory entry including its corresponding parity bit into the cache directory. The process then terminates as illustrated by block 620.

Figure 7:
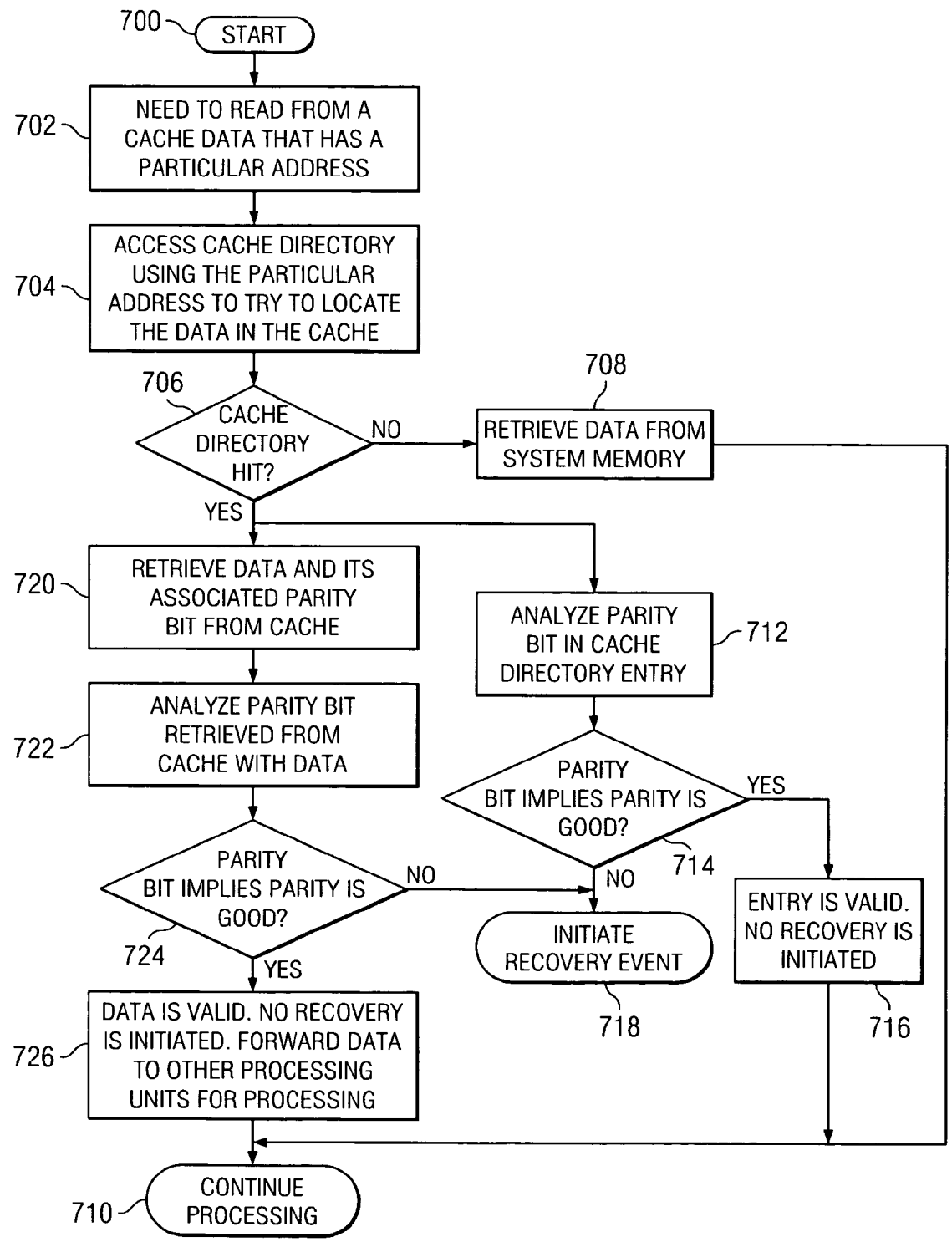
FIG. 7 illustrates a high level flow chart that depicts utilizing a cache directory to access information in a cache in accordance with the present invention.

FIG. 7 illustrates a high level flow chart that depicts utilizing a cache directory to access data in a cache in accordance with the present invention. The process starts as depicted by block 700 and thereafter passes to block 702 which illustrates needing to read, from the cache, data that has a particular address. Next, block 704 depicts accessing the cache directory using the particular address to try to locate the address tag in the cache directory that corresponds to the particular address.

The process then passes to block 706 which illustrates a determination of whether or not there was a cache directory hit. A cache directory hit occurs when a cache directory entry is found in the cache directory that corresponds to the particular address tag. When a cache directory hit occurs, the data having the address, which is indicated by the particular address tag, is stored in the cache. When a cache directory miss occurs, the data having the address, which is indicated by the particular address tag, is not stored in the cache and must be retrieved from other memory such as system memory.

Referring again to block 706, if a determination is made that a cache directory hit did not occur, the process passes to block 708 which depicts retrieving the data from the system memory. The process then passes to block 710 which illustrates continuing processing.

Referring again to block 706, if a determination is made that a cache directory hit did occur, the process passes concurrently to both blocks 712 and 720. The processes depicted by blocks 712-716 and blocks 720-726 are executed in parallel with each other.

Block 712 depicts analyzing the parity bit that is included in the cache directory entry that corresponds to the particular address tag. Thereafter, block 714 illustrates a determination of whether or not this cache directory entry's parity bit implies that the parity is good. If a determination is made that the parity bit implies that the parity is bad, the process passes to block 718 which depicts initiating an error recovery event. Referring again to block 714, if a determination is made that the parity bit implies that the parity is good, the process passes to block 716 which illustrates the entry being determined to be valid. No recovery is needed or initiated. The process then passes to block 710 which depicts continuing processing.

Block 720 depicts retrieving the data and its associated parity bit from the cache. Thereafter, block 722 illustrates analyzing the parity bit that was included with the data in the cache. This parity bit is the parity bit that is associated with this particular data. Next, block 724 illustrates a determination of whether or not this data's parity bit implies that the parity is good. If a determination is made that the parity bit implies that the parity is bad, the process passes to block 718 which depicts initiating an error recovery event. Referring again to block 724, if a determination is made that the parity bit implies that the parity is good, the process passes to block 726 which illustrates the data being determined to be valid and forwarding the data to other processing units for processing. The process then passes to block 710 which depicts continuing processing.

Figure 8:
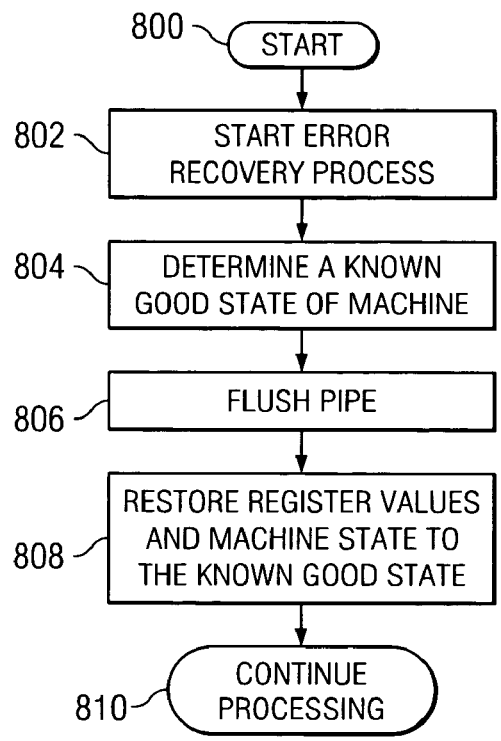
FIG. 8 depicts a high level flow chart that illustrates executing an error recovery process in a machine in accordance with the present invention.

FIG. 8 depicts a high level flow chart that illustrates executing an error recovery process in a computer system machine in accordance with the present invention. The process starts as depicted by block 800 and thereafter passes to block 802 which illustrates starting an error recovery process in the processor. Next, block 804 depicts determining a known good state for the machine that includes this processor. The process then passes to block 806 which illustrates flushing the pipe. This means that the results of the bad instruction are flushed. When the pipe is flushed, the instructions are flushed such that the bad instructions and any results of those bad instructions are flushed. When the bad instructions and their results are flushed, the architected registers and memory do not include the bad instructions or any results of the bad instructions.

Next, block 808 depicts restoring the register values and the machine state to the known good state. The process then passes to block 810 which illustrates continuing processing after the known good state is restored.

Figure 9:
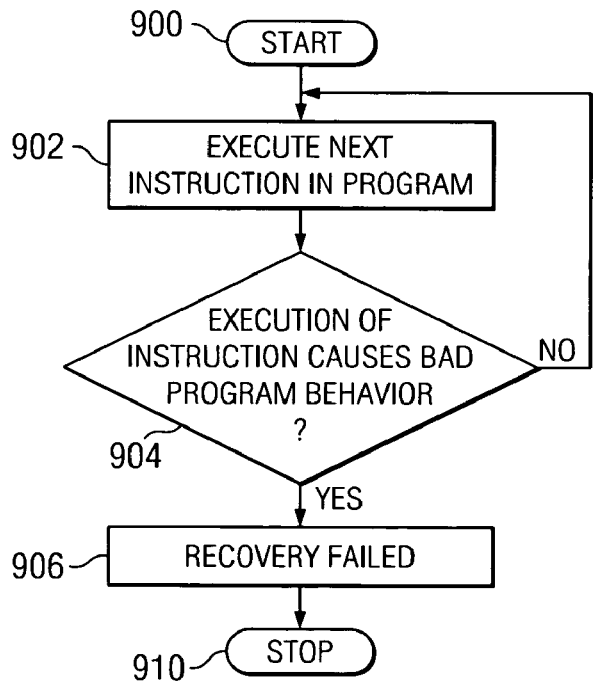
FIG. 9 depicts a high level flow chart that illustrates determining whether an error recovery process failed by analyzing the execution of instructions in accordance with the present invention.

FIG. 9 depicts a high level flow chart that illustrates determining whether an error recovery process failed by analyzing the execution of instructions in accordance with the present invention. The process depicted by FIG. 9 occurs in concurrently with the process depicted by FIG. 8.

The process starts as depicted by block 900 and thereafter passes to block 902 which illustrates executing a next instruction in a program. Next, block 904 depicts a determination of whether or not the execution of the next instruction caused bad program behavior. Bad program behavior is when a program behaves in an unexpected manner. If a determination is made that the execution of the next instruction did not cause bad program behavior, the process passes back to block 902. Referring again to block 904, if a determination is made that the execution of the next instruction did cause bad program behavior, the process passes to block 906 which depicts determining that the error recovery process failed. The process then terminates as illustrated by block 910.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for testing a data processing system's ability to recover from cache directory errors, said method comprising:
storing a directory entry into a cache directory, said directory entry including an address tag and directory parity that is associated with said address tag;
storing a cache entry into a cache that is accessed using said cache directory, said cache entry including information and cache parity that is associated with said information;
altering said directory parity to imply bad parity, said bad parity implying that said associated address tag is invalid;
altering said information to be incorrect, said cache parity indicating good parity, said good parity implying that said information is valid; and
testing said data processing system's ability to recover from errors using said directory entry and said cache entry.

2. The method according to claim 1, further comprising:
said directory parity being represented using a parity bit;
altering said parity bit by changing a value of said parity bit from one value to another value; and
altering said information by changing values of two bits in said information from one value to another value.

3. The method according to claim 1, further comprising:
accessing said directory entry to locate said cache entry;
accessing said directory parity from said directory entry;
determining whether said directory parity implies good parity or bad parity;
in response to said directory parity implying bad parity, initiating a recovery event.

4. The method according to claim 3, further comprising:
concurrently with accessing said directory entry to locate said cache entry, accessing said directory parity from said directory entry, and determining whether said directory parity implies good parity or bad parity:
accessing said cache entry to retrieve said information from said cache entry;
accessing said cache parity from said cache entry;
determining whether said cache parity implies good parity or bad parity;

in response to said cache parity implying good parity, processing said information that is included in said cache entry.

5. The method according to claim 4, further comprising:

determining whether said recovery event was successfully completed;

in response to said recovery event being successfully completed, determining whether processing said information resulted in bad program behavior;

in response to determining that processing said information did result in bad program behavior, determining that said recovery event was unsuccessfully completed; and in response to determining that processing said information did not result in bad program behavior, determining that said recovery event was successfully completed.

6. The method according to claim 3, further comprising:

executing said recovery event including:

flushing a pipe that was processing said instruction; and
restoring said data processing system to a known good state.

7. The method according to claim 1, further comprising:
said information being data.

8. The method according to claim 1, further comprising:
said information being an instruction.

* * * * *